8464X
Dudley & Brooks,
Tanning Apparatus,
Patented Oct. 23, 1834.
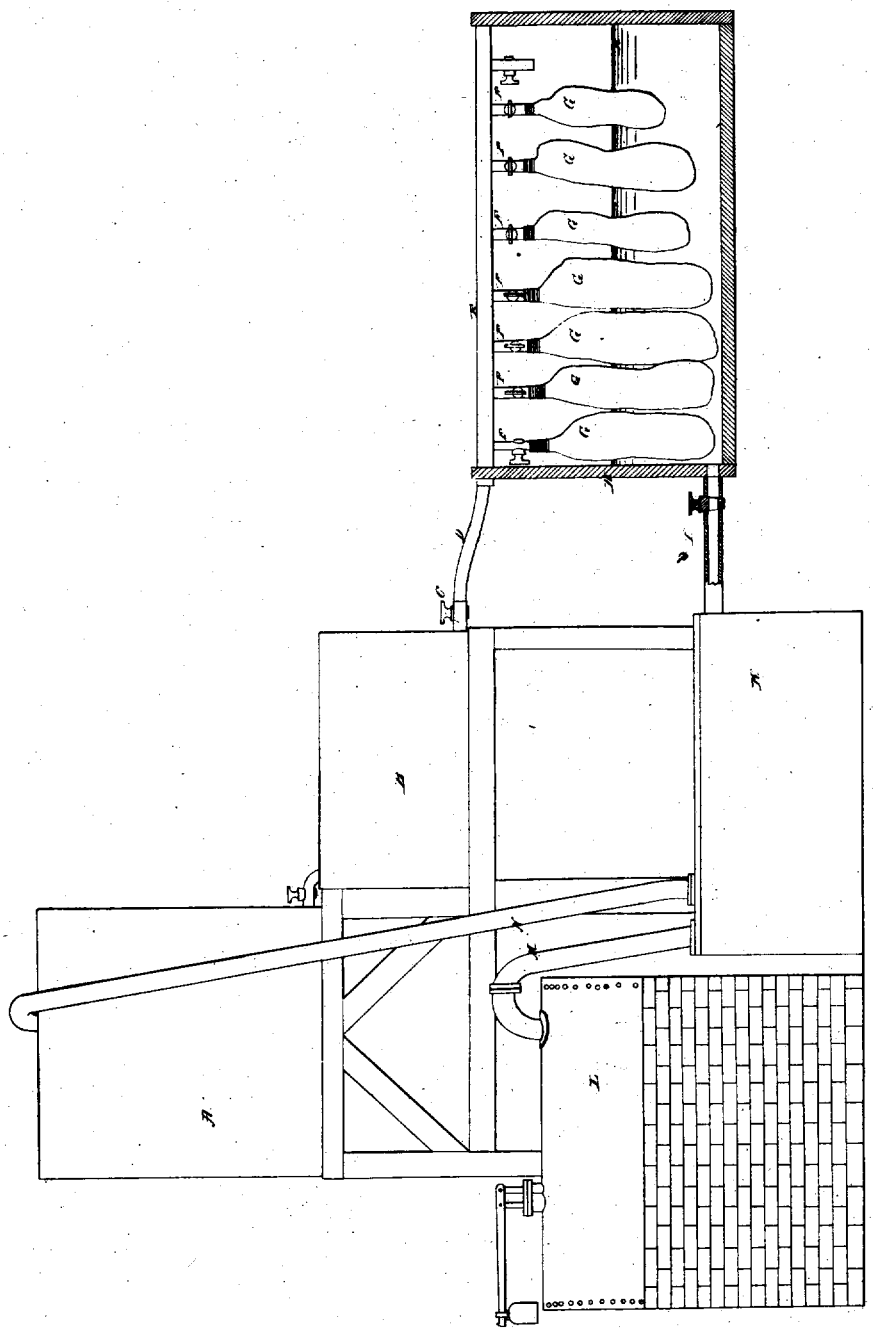
N. PETERS, PHOTO-LITHOGRAPHER, WASHINGTON, D. C.

8464x Oct 23 1834

Lemuel C Dadley and Samuel Brooks
Letters Patent

The Schedule referred to in these Letters Patent (and making part of
the same containing a description in the words of the said Lemuel C Da
ley and Samuel Brooks themselves of their improvement in a Machine for
Tanning Leather

---

To all persons to whom these Presents shall come
Lemuel C. Dadley and Samuel Brooks of Portland in the County of
Cumberland and State of Maine, send greeting. Be it known that we t
said Lemuel C. Dadley and Samuel Brooks, have invented constructed
made and applied to use a new and useful Machine for tanning leather spec
fied in the words following viz. This Machine for tanning leather consis
of a leech for making the liquor for tanning and a reservoir attached to it for
containing the liquor as it passes into it from the leech. The reservoir is con
nected by a faucet and leather hose with a long tube, which tube is situate
over a large tub in which the skins or hides to be tanned are placed. In th
tube are placed a number of faucets or cocks for the purpose of letting the l
quor into the hides or skins. which are sewed up in the form of bags and
attached to each faucet or cock. A lead pipe with a faucet or cock i
it, connects the large tub with a receiver into which the liquor is recei
after it passes through the skins into the large tub. From the receiver the li
quor is forced back into the leech through a lead pipe by means of a steam
boiler which is connected with the receiver by another lead pipe and t
liquor is then ready to be passed into the reservoir again. then into the tu
with the faucets or cocks and then again into the hides. And thus the
ation is continued until the hides are sufficiently tanned. The Machin
may be made of any size to suit convenience and to tan from ten to a thousan
hides at a time. To put the machine in operation after the liquor for ta
ning is made and the skins or hides attached or fastened by strings to the
faucets or cocks all that is necessary is to turn the different faucets or
cocks. The faucet or cock between the reservoir and the long tube and there in the long tube (and that between the large tub and the receiver are to
be opened first, and when the receiver is full, the faucet or cock between
the large tub (and the receiver is to be closed and the steam cock opened.
In testimony that the above is a true specification of our said Ma
chine fo tanning leather as above described we have hereunto set our hands
this second day of August in the year of our Lord one thousand eight hun-
dred and thirty three Recd. Witnesses
W.H. W. T. Smith
Edward A. Gardner Lemuel C. Dadley
Samuel Brooks Drawing (518 words)